US011614244B2

(12) United States Patent
Tanaka et al.

(10) Patent No.: US 11,614,244 B2
(45) Date of Patent: Mar. 28, 2023

(54) AIR CONDITIONING SYSTEM

(71) Applicant: DAIKIN INDUSTRIES, LTD., Osaka (JP)

(72) Inventors: Shuuichi Tanaka, Osaka (JP); Yoshiteru Nouchi, Osaka (JP); Kouji Tatsumi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/603,772

(22) PCT Filed: Apr. 15, 2020

(86) PCT No.: PCT/JP2020/016618
§ 371 (c)(1),
(2) Date: Oct. 14, 2021

(87) PCT Pub. No.: WO2020/213655
PCT Pub. Date: Oct. 22, 2020

(65) Prior Publication Data
US 2022/0146124 A1    May 12, 2022

(30) Foreign Application Priority Data

Apr. 15, 2019 (JP) .............................. JP2019-077306

(51) Int. Cl.
*F24F 3/00* (2006.01)
*F24F 11/74* (2018.01)
(Continued)

(52) U.S. Cl.
CPC .............. *F24F 3/001* (2013.01); *F24F 3/044* (2013.01); *F24F 11/74* (2018.01); *F24F 11/89* (2018.01); *F24F 13/02* (2013.01); *F24F 2110/40* (2018.01)

(58) Field of Classification Search
CPC .. F24F 3/001; F24F 3/044; F24F 11/74; F24F 11/89; F24F 2110/40; F24F 2003/0448; F24F 2007/005; F24F 7/065
See application file for complete search history.

(56) References Cited

U.S. PATENT DOCUMENTS

| 4,513,574 A | 4/1985 | Humphreys et al. |
| 4,921,164 A * | 5/1990 | Gotou ....................... F24F 11/72 236/49.3 |

(Continued)

FOREIGN PATENT DOCUMENTS

| CN | 101769574 A | 7/2010 |
| CN | 109163386 A | 1/2019 |

(Continued)

OTHER PUBLICATIONS

International Preliminary Report on Patentability and English translation of the Written Opinion of the International Searching Authority for International Application No. PCT/JP2020/016618, dated Oct. 28, 2021.

(Continued)

*Primary Examiner* — Nelson J Nieves
(74) *Attorney, Agent, or Firm* — Birch, Stewart, Kolasch & Birch, LLP

(57) ABSTRACT

Provided is an air conditioning system that uses ducts to supply conditioned air to a plurality of places inside a building, and is configured to counteract air backflow that occurs in ducts. A heat exchanger unit (10) includes a use side heat exchanger (11). A plurality of ducts (20) are connected to the heat exchanger unit (10). A plurality of fan units (30) suction conditioned air from the heat exchanger unit (10), and supply the conditioned air to a plurality of air outlets (71) through the plurality of ducts (20). A differential pressure sensor (121) acting as a detection device detects air backflow proceeding from at least one air outlet (71) among (Continued)

the plurality of air outlets (71) toward the heat exchanger unit (10) in a plurality of distribution flow paths including the plurality of ducts (20), the plurality of fan units (30), and the air outlets (71) of a plurality of outlet units (70).

21 Claims, 5 Drawing Sheets

(51) Int. Cl.
    *F24F 11/89*          (2018.01)
    *F24F 13/02*          (2006.01)
    *F24F 3/044*          (2006.01)
    *F24F 110/40*        (2018.01)

(56) References Cited

U.S. PATENT DOCUMENTS

| | | | |
|---|---|---|---|
| 5,230,719 A * | 7/1993 | Berner | F24F 12/001 165/4 |
| 5,701,750 A * | 12/1997 | Ray | F24F 11/77 236/1 EA |
| 8,814,639 B1 | 8/2014 | Mecozzi | |
| 9,188,355 B1 | 11/2015 | Allen et al. | |
| 9,534,797 B2 | 1/2017 | Tsutsumi | |
| 2006/0234621 A1* | 10/2006 | Desrochers | G01N 1/26 702/50 |
| 2008/0242218 A1 | 10/2008 | Asano et al. | |
| 2010/0174414 A1 | 7/2010 | Takagi et al. | |
| 2010/0323604 A1* | 12/2010 | Duffe | F24F 7/065 454/258 |
| 2012/0192955 A1 | 8/2012 | Dazai | |
| 2012/0295530 A1 | 11/2012 | Ikeno et al. | |
| 2013/0281000 A1* | 10/2013 | Newcomer | F24F 7/08 454/237 |
| 2014/0273797 A1* | 9/2014 | Jensen | F24F 7/065 454/251 |
| 2015/0241076 A1 | 8/2015 | Eguchi et al. | |
| 2017/0299211 A1* | 10/2017 | Kobayashi | F24F 11/62 |
| 2017/0341094 A1* | 11/2017 | Khalitov | B05B 3/105 |
| 2018/0045424 A1 | 2/2018 | Yajima et al. | |
| 2018/0100667 A1 | 4/2018 | Komae et al. | |
| 2018/0363933 A1 | 12/2018 | Ross | |
| 2019/0024929 A1 | 1/2019 | Funada et al. | |

FOREIGN PATENT DOCUMENTS

| | | |
|---|---|---|
| DE | 20 2018 000 922 U1 | 5/2018 |
| EP | 2 781 846 A1 | 9/2014 |
| JP | 59-184033 U | 12/1984 |
| JP | 60-21653 U | 2/1985 |
| JP | 61-71840 U | 5/1986 |
| JP | 1-300135 A | 12/1989 |
| JP | 4-32634 A | 2/1992 |
| JP | 4-116329 A | 4/1992 |
| JP | 5-157278 A | 6/1993 |
| JP | 5-180501 A | 7/1993 |
| JP | H05-223328 A | 8/1993 |
| JP | H-06-50597 A | 2/1994 |
| JP | 6-159770 A | 6/1994 |
| JP | 8-42909 A | 2/1996 |
| JP | H08-261545 A | 10/1996 |
| JP | 10-220853 A | 8/1998 |
| JP | 10-253132 A | 9/1998 |
| JP | 11-132489 A | 5/1999 |
| JP | 2001-304614 A | 10/2001 |
| JP | 2002-162067 A | 6/2002 |
| JP | 2002-372277 A | 12/2002 |
| JP | 2005-326106 A | 11/2005 |
| JP | 2008-51466 A | 3/2008 |
| JP | 2010-108359 A | 5/2010 |
| JP | 2010-181046 A | 8/2010 |
| JP | 2010-210216 A | 9/2010 |
| JP | 2011-52905 A | 3/2011 |
| JP | 2012-77968 A | 4/2012 |
| JP | 2012-141088 A | 7/2012 |
| JP | 2012-154596 A | 8/2012 |
| JP | 2012-225640 A | 11/2012 |
| JP | 5426322 B | 12/2013 |
| JP | 2014-095541 A | 5/2014 |
| JP | 2018-100791 A | 6/2018 |
| JP | 2018-155444 A | 10/2018 |
| JP | 2015-206519 A | 11/2018 |
| JP | 2019-11884 A | 1/2019 |
| JP | 2019-49387 A | 3/2019 |
| KR | 10-1128574 B1 | 3/2012 |
| TW | 1651493 B | 3/2017 |
| TW | M566801 U | 9/2018 |
| WO | WO 2017/159208 A1 | 9/2017 |
| WO | WO 2018/100657 A1 | 6/2018 |

OTHER PUBLICATIONS

International Search Report, issued in PCT/JP2020/016618, dated Jun. 30, 2020.
U.S. Appl. No. 17/603,763, filed Oct. 14, 2021, Not Yet Assigned.
U.S. Appl. No. 17/603,785, filed Oct. 14, 2021, Not Yet Assigned.
U.S. Appl. No. 17/603,691, filed Oct. 14, 2021, Not Yet Assigned.
U.S. Appl. No. 17/603,758, filed Oct. 14, 2021, Not Yet Assigned.
U.S. Appl. No. 17/603,792, filed Oct. 14, 2021, Not Yet Assigned.
Extended European Search Report dated Apr. 25, 2022 in corresponding European Application No. 20790587.8.
Extended European Search Report dated May 13, 2022 in corresponding European Application No. 20791231.2.
Extended European Search Report dated May 19, 2022 in corresponding European Application No. 20794326.7.
Extended European Search Report dated May 9, 2022 in corresponding European Application No. 19925110.9.
Extended European Search Report dated May 9, 2022 in corresponding European Application No. 20790812.0.
Extended European Search Report dated May 9, 2022 in corresponding European Application No. 20791360.9.
Chinese Office Action and Search Report dated Jun. 29, 2022 for Application No. 202080029089.8 with an English translation.
Tragon, "Mine Ventilation Technology and Air Conditioning" Coal Industry Press, 1st Edition, May 2014 pp. 93-95 (6 pages total).

* cited by examiner

AIR CONDITIONING SYSTEM

TECHNICAL FIELD

The present disclosure relates to an air conditioning system provided with a plurality of fan units.

BACKGROUND ART

Among air conditioning systems of the prior art that provide air conditioning inside a building, there exists an air conditioning system that supplies conditioned air to a plurality of places inside a building by sending conditioned air that has exchanged heat in a use side heat exchanger through ducts, as described in Patent Literature 1 (JP H11-132489 A) for example.

SUMMARY OF THE INVENTION

Technical Problem

However, in the air conditioning system described in Patent Literature 1, if the air flow passing through the use side heat exchanger drops for example, there are concerns that air backflow, in which indoor air flows into the ducts, may occur.

In such an air conditioning system that uses ducts to supply conditioned air to a plurality of places inside a building, one challenge is to counteract the air backflow that occurs in the ducts.

Solution to Problem

An air conditioning system according to a first aspect is an air conditioning system including a heat exchanger unit including a use side heat exchanger, and configured to generate conditioned air through heat exchange in the use side heat exchanger and supply the conditioned air to an air conditioned space through a plurality of distribution flow paths that communicate with the heat exchanger unit. Each distribution flow path is connected to the heat exchanger unit and includes a duct for distributing the conditioned air and a fan unit provided in correspondence with the duct and configured to supply the conditioned air from the heat exchanger unit through the duct to an air outlet. At least one of the duct and the fan unit is provided with a detection device configured to detect an air backflow proceeding from the air outlet toward the heat exchanger unit.

In the air conditioning system according to the first aspect, the detection device is configured to detect air backflow in the distribution flow path, and therefore by detecting the air backflow, the air conditioning system can operate to counteract the air backflow.

An air conditioning system according to a second aspect is the system according to the first aspect, and the detection device includes a differential pressure sensor configured to detect a differential pressure inside the plurality of distribution flow paths and/or a wind direction sensor configured to detect a direction of a flow of air through the plurality of distribution flow paths.

The air conditioning system according to the second aspect includes a differential pressure sensor and/or a wind direction sensor, and therefore can explicitly detect air backflow in a plurality of distribution flow paths in the places where the differential pressure sensor and/or wind direction sensor is installed.

An air conditioning system according to a third aspect is the system according to any of the first aspect or the second aspect, and the detection device detects the air backflow by using temperature of air inside the plurality of distribution flow paths.

In the air conditioning system according to the third aspect, the detection device uses temperature of air in a plurality of distribution flow paths to detect air backflow, and therefore the air conditioning system can detect air backflow with an inexpensive temperature sensor such as a thermistor, and increases in costs related to detecting air backflow are moderated more easily.

An air conditioning system according to a fourth aspect is the system according to the third aspect, and the detection device includes a first temperature sensor installed in the plurality of distribution flow paths, and is configured to detect the air backflow by using a temperature change in the first temperature sensor.

The air conditioning system according to the fourth aspect uses a temperature change in the first temperature sensor to detect air backflow, and therefore can detect air backflow in the distribution flow paths using a small number of inexpensive sensors, and the costs related to detecting air backflow are reduced more easily.

An air conditioning system according to a fifth aspect is the system according to the third aspect, and the detection device includes a first temperature sensor and a second temperature sensor installed in different flow regions of the plurality of distribution flow paths, and is configured to detect the air backflow by using a temperature difference between the first temperature sensor and the second temperature sensor.

The air conditioning system according to the fifth aspect detects air backflow by using the temperature difference between the first temperature sensor and the second temperature sensor installed in different flow regions, and therefore can detect air backflow in the distribution flow paths precisely using inexpensive sensors.

An air conditioning system according to a sixth aspect is the system according to the third aspect, and the detection device includes a first temperature sensor installed in the plurality of distribution flow paths and a third temperature sensor configured to detect a temperature of the air conditioned space, and is configured to detect the air backflow by using a temperature difference between the first temperature sensor and the third temperature sensor.

The air conditioning system according to the sixth aspect detects air backflow by using the temperature difference between the first temperature sensor installed in a plurality of distribution flow paths and the third temperature sensor that detects the temperature in the air conditioned space, and therefore can detect air backflow in the distribution flow paths precisely using inexpensive sensors.

An air conditioning system according to a seventh aspect is the system according to the first aspect, the fan unit internally includes a fan rotor and a fan motor configured to cause the fan rotor to rotate, and the detection device detects the air backflow by using rotation of at least one of the fan motor and the fan rotor.

The air conditioning system according to the seventh aspect can detect air backflow in the distribution air paths precisely using an inexpensive detection device.

An air conditioning system according to an eighth aspect is the system according to any of the first aspect to the seventh aspect, and air flow passing through the use side heat exchanger is produced by only an air suction force of the fan unit.

The air conditioning system according to the eighth aspect is configured to generate the air flow passing through the use side heat exchanger using only the air suction force of the fan unit, and therefore a power source for generating air flow in the heat exchanger unit does not have to be provided. Consequently, costs can be reduced compared to the case of providing a power source for generating air flow in the heat exchanger unit.

An air conditioning system according to a ninth aspect is the system according to any of the first aspect to the eighth aspect, and in a case where the detection device detects the air backflow, the fan unit in the distribution flow path where the air backflow is occurring is made to operate to cancel out the air backflow or to block air flow in the distribution flow path where the air backflow is occurring.

In the air conditioning system according to the ninth aspect, in the case where the detection device detects air backflow, the air conditioning system is configured to operate to cancel out the air backflow with the fan unit of the distribution flow path that is generating the air backflow or block the air flow in the distribution flow path that is generating the air backflow, and therefore can operate while also suppressing problems due to the air backflow.

DESCRIPTION OF EMBODIMENTS

First Embodiment (1) Overall Configuration

Figure 1:
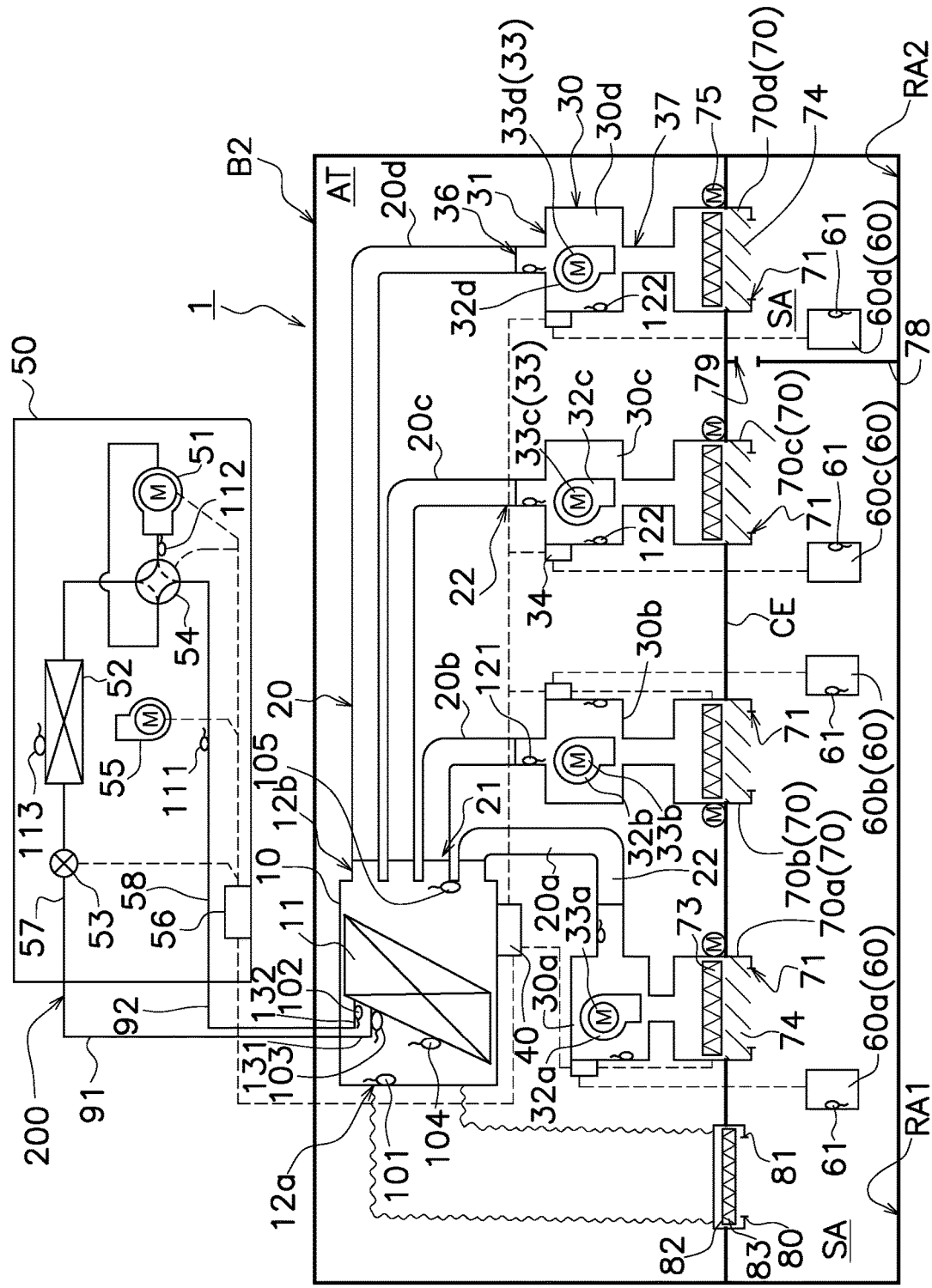
FIG. 1 is a schematic diagram illustrating an overview of the configuration of an air conditioning system.

An air conditioning system 1 illustrated in FIG. 1 supplies conditioned air to an air conditioned space SA. Examples of the air conditioned space SA include rooms RA1 and RA2 in a building BL, or the like. Here, descriptions will be given in a case where the air conditioned spaces SA are two rooms RA1 and RA2, however, the air conditioning system 1 may be provided in corresponding to rooms in various size, various shape, and various numbers. It is preferable that the air conditioned spaces SA to which the air conditioning system 1 supplies conditioned air be surrounded (front and back, up and down, and left and right) by wall surfaces like the rooms RA1 and RA2. Note that the air conditioned spaces SA are not limited to the rooms RA1 and RA2, but may be, for example, corridors, stairs, and entrances.

The air conditioning system 1 includes, as illustrated in FIG. 1, a heat exchanger unit 10 including a use side heat exchanger 11. The air conditioning system 1 generates conditioned air through heat exchange in the use side heat exchanger 11 and supplies the conditioned air to an air conditioned space SA through a plurality of distribution flow paths that communicate with the heat exchanger unit 10. Each distribution flow path is connected to the heat exchanger unit 10 and includes a duct 20 for distributing the conditioned air and a fan unit 30 provided in correspondence with the duct 20 and configured to supply the conditioned air from the heat exchanger unit 10 through the duct 20 to an air outlet 71. At least one of the duct 20 in each distribution flow path and the fan unit 30 is provided with a detection device configured to detect an air backflow proceeding from the air outlet 71 toward the heat exchanger unit 10. The detection device is a differential pressure sensor 121, for example. Note that when distinguishing one among the plurality of ducts 20, a letter of the alphabet is appended, like the duct 20a. Here, four ducts 20a to 20d are illustrated as the ducts 20. Also, four fan units 30a to 30d are illustrated as the fan units 30. Also, four outlet units 70a to 70d and four remote controllers 60a to 60d are illustrated as the outlet units 70 and the remote controllers 60, respectively.

The heat exchanger unit 10 includes a function of generating conditioned air by heat exchange in the use side heat exchanger 11. One end 21 of each of the plurality of ducts 20 is connected to the heat exchanger unit 10. The plurality of ducts 20 are a plurality of pipes that send conditioned air generated by the heat exchanger unit 10, and include a function of distributing the conditioned air.

The plurality of fan units 30 are connected to another end 22 of the plurality of ducts 20. Here, the fan unit 30a is connected to the corresponding duct 20a connected to the heat exchanger unit 10, for example. Similarly, the fan units 30b to 30d are also connected to the corresponding ducts 20b to 20d, respectively. Although a case where each duct 20 has a single one end 21 and a single other end 22 is described herein, a single duct 20 may also branch from a single one end 21 into a plurality of other ends 22, and the fan unit 30 may be connected respectively to each of the plurality of other ends 22 branching in this way. Also, the fan units 30a to 30d are connected to the outlet units 70a to 70d and the remote controllers 60a to 60d.

The air conditioning system 1 includes a plurality of air outlets 71 disposed in the air conditioned space SA. Each fan unit 30 supplies conditioned air to each corresponding air outlet 71. To supply conditioned air to each air outlet 71, each fan unit 30 draws in conditioned air from the heat exchanger unit 10 through each duct 20. To draw in conditioned air, each fan unit 30 includes a fan 32 inside a casing 31 of each fan unit 30. Each fan 32 sends air from the other end 22 of each duct 20 toward each air outlet 71. One or a plurality of fans 32 may be included in each fan unit 30. Here, one each of the fans 32a to 32d is respectively provided in the casing 31 of each of the fan units 30a to 30d.

Each fan unit 30 is configured to change the individual air supply amounts of the conditioned air to be supplied to each air outlet 71 with an actuator. Here, a fan motor 33 with a variable rotation speed is the actuator. Here, four fan motors 33a to 33d are configured such that the rotation speed can be changed individually, and by causing the fan motors 33a to 33d to change the respective rotation speed individually, the fan units 30a to 30d can change the air supply amounts individually.

The air conditioning system 1 outputs instructions related to increasing or decreasing the air supply amounts to the plurality of actuators from a main controller 40. A control system of the air conditioning system 1, including the main controller 40, will be described later.

In addition to the above configuration, the air conditioning system 1 is provided with a heat source unit 50, the remote controllers 60, the outlet units 70, an inlet unit 80, and various sensors. The sensors provided in the air conditioning system 1 will be described later.

(2) Detailed Configuration

(2-1) Heat Exchanger Unit 10

The heat exchanger unit 10 is provided with the use side heat exchanger 11, a hollow housing 12 that houses the use side heat exchanger 11, and the main controller 40. The housing 12 includes an air inflow port 12a connected to an inlet 81 and a plurality of air outflow ports 12b connected to the plurality of ducts 20. Here, the case of a single air inflow port 12a is illustrated, but a plurality of air inflow ports 12a may also be provided. The use side heat exchanger 11 is a fin-and-tube heat exchanger, for example, and causes heat to be exchanged between air passing between heat transfer fins and a refrigerant flowing through heat transfer tubes. When air suctioned from the air inflow port 12a passes through the use side heat exchanger 11, the air exchanges heat with the refrigerant passing through the use side heat exchanger 11, and conditioned air is generated. The conditioned air generated by the use side heat exchanger 11 is suctioned into each of the ducts 20a to 20d from the air outflow ports 12b.

The heat exchanger unit 10 is not provided with a fan. The reason why the heat exchanger unit 10 can suction air from the air inflow port 12a is that negative pressure exists inside the heat exchanger unit 10 due to the plurality of ducts 20 suctioning air from all of the plurality of air outflow ports 12b.

(2-2) Ducts 20

The plurality of ducts 20 including the function of distributing conditioned air are connected to the plurality of air outflow ports 12b of the heat exchanger unit 10 and to the plurality of fan units 30. Here, the case where each of the fan units 30 and each of the outlet units 70 are connected directly is described, but the ducts 20 may also be disposed between the fan units 30 and the outlet units 70, such that the fan units 30 and the outlet units 70 are connected by the ducts 20.

Metal pipes having a fixed shape or pipes having a freely bendable material may be used as the ducts 20. By joining such ducts 20 together, various arrangements of the heat exchanger unit 10, the plurality of fan units 30, and the plurality of outlet units 70 are possible.

Figure 2:
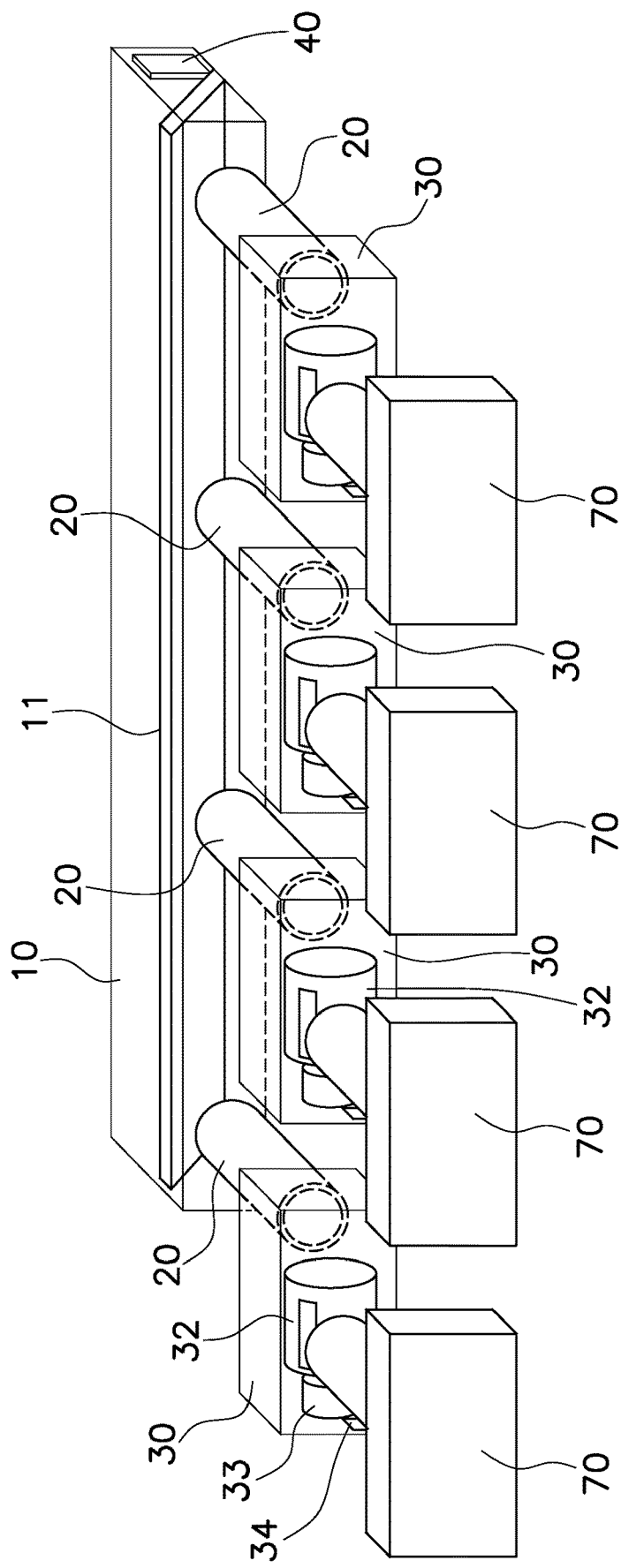
FIG. 2 is a schematic perspective view of one example of connecting a heat exchanger unit, ducts, fan units, and outlet units.

In FIG. 2, the heat exchanger unit 10, four fan units 30, and four outlet units 70 connected in a ceiling-concealed space AT are schematically illustrated. The heat exchanger unit 10, fan units 30, and outlet units 70 configured in this way are easily formed thinly, and therefore may also be disposed in a space under the floor of rooms RA1 and RA2.

(2-3) Fan Unit 30

For the fan 32 provided in each fan unit 30, a centrifugal fan may be used, for example. The centrifugal fan used as the fan 32 may be a sirocco fan, for example. The casing 31 provided in each fan unit 30 includes an intake port 36 and an exhaust port 37. The other end 22 of each duct 20 is connected to the intake port 36 of each casing 31. The outlet of each fan 32 and the corresponding outlet unit 70 are connected to the exhaust port 37 of each casing 31. Conditioned air blown out from the fan 32 passes through the outlet unit 70 and is blown out from the air outlet 71.

A fan controller 34 is attached to the casing 31. Here, all of the fan controllers 34 are connected to the main controller 40.

Figure 3:
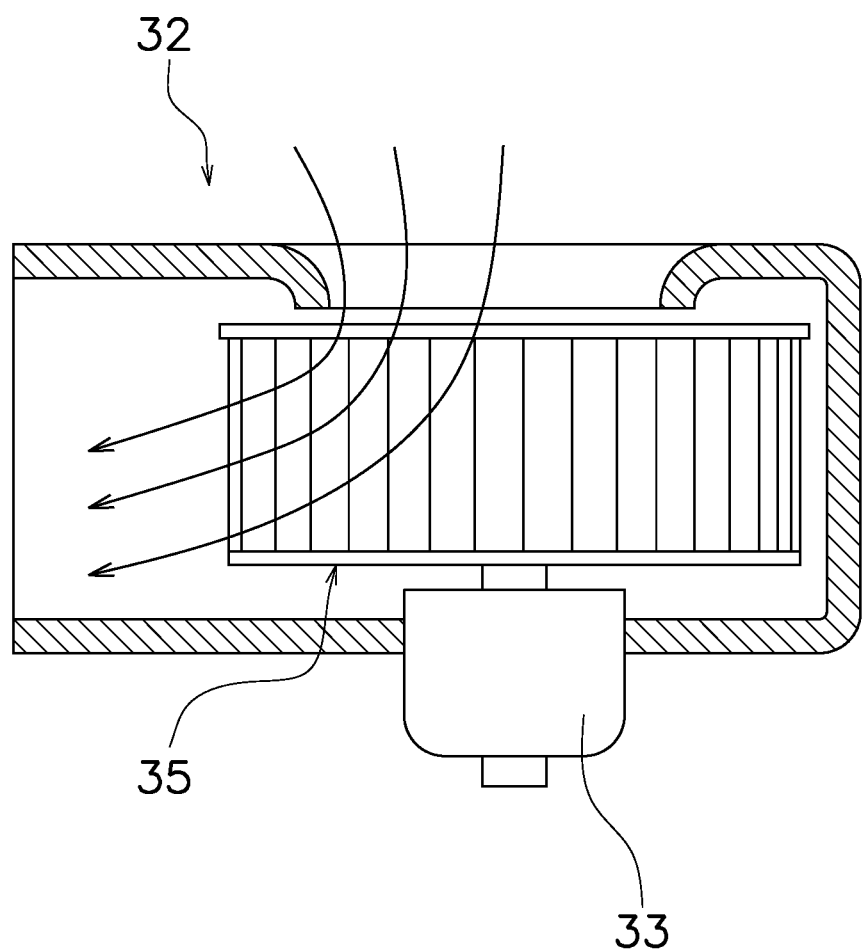
FIG. 3 is a cross section view of one example of a fan in a fan unit.

In FIG. 3, a sirocco fan is illustrated as one example of the fan 32. The rotation speed of the fan motor 33 that causes a fan rotor 35 of the fan 32 to rotate can be changed. Consequently, by changing the rotation speed of the fan motor 33, the amount of air supplied by the fan 32 can be changed. The fan controller 34 is connected to the fan motor 33, and is capable of controlling the rotation speed of the fan motor 33.

Each fan unit 30 is provided with a differential pressure sensor 121 that functions as an air flow volume detection unit described later, and each fan controller 34 is capable of automatically correcting the rotation speed of the fan motor 33 needed to produce the necessary air supply amount, even if the air resistance occurring in the ducts 20 to each fan unit 30 is different depending on the duct length. However, such a correction function does not have to be included in the fan unit 30 in some cases.

(2-4) Heat Source Unit 50

The heat source unit 50 supplies heat energy demanded by the heat exchange in the use side heat exchanger 11 of the heat exchanger unit 10. The air conditioning system 1 illustrated in FIG. 1 causes a refrigerant to circulate between the heat source unit 50 and the heat exchanger unit 10, and thereby performs a vapor compression refrigeration cycle. The heat source unit 50 and the heat exchanger unit 10 form a refrigeration cycle apparatus that performs the vapor compression refrigeration cycle. In the example illustrated in FIG. 1, the heat source unit 50 is disposed on the outside of the building BL and treats outdoor air as the heat source, but the installation location of the heat source unit 50 is not limited to the outside of the building BL.

The heat source unit 50 is provided with a compressor 51, a heat source side heat exchanger 52, an expansion valve 53, a four-way valve 54, a heat source side fan 55, a heat source controller 56, and in-unit refrigerant pipes 57 and 58. A discharge port of the compressor 51 is connected to a first port of the four-way valve 54, and a suction port of the compressor 51 is connected to a third port of the four-way valve 54. The compressor 51 compresses a refrigerant in a gaseous state (hereinafter also referred to as a gas refrigerant) or a refrigerant in a gas-liquid two-phase state suctioned from the suction port, and discharges the compressed refrigerant from the discharge port. The compressor 51 includes a built-in compressor motor whose rotation speed (or operating frequency) can be changed by inverter control, for example. The compressor 51 is capable of changing the amount of discharged refrigerant per unit time by changing the operating frequency.

The second port of the four-way valve 54 is connected to one of the ports of the heat source side heat exchanger 52, while the fourth port is connected to the in-unit refrigerant pipe 58. During the cooling operation, as illustrated by the solid lines, the four-way valve 54 causes the refrigerant to flow from the first port to the second port to send the refrigerant discharged from the compressor 51 to the heat source side heat exchanger 52, and causes the refrigerant to flow from the fourth port to the third port to send the refrigerant from the use side heat exchanger 11 through an in-unit refrigerant pipe 132, a connection pipe 92, and the in-unit refrigerant pipe 58 to the suction port of the compressor 51. During the heating operation, as illustrated by the dashed lines, the four-way valve 54 causes the refrigerant to flow from the first port to the fourth port to send the refrigerant discharged from the compressor 51 through the in-unit refrigerant pipe 58, the connection pipe 92, and the in-unit refrigerant pipe 132 to the use side heat exchanger 11, and causes the refrigerant to flow from the second port to the third port to send the refrigerant from the heat source side heat exchanger 52 to the suction port of the compressor 51. The heat source side heat exchanger 52 is a fin-and-tube heat exchanger, for example, and causes heat to be exchanged between air passing between heat transfer fins and a refrigerant flowing through heat transfer tubes.

The other port of the heat source side heat exchanger 52 is connected to one end of the expansion valve 53, and the other end of the expansion valve 53 is connected to one of the ports of the use side heat exchanger 11 through the in-unit refrigerant pipe 57, a connection pipe 91, and an in-unit refrigerant pipe 131. The other port of the use side heat exchanger 11 is connected to the in-unit refrigerant pipe 132.

By connecting the heat source unit 50 and the heat exchanger unit 10 as above, a refrigerant circuit 200 is formed. During the cooling operation in the refrigerant circuit 200, a refrigerant flows through the compressor 51, the four-way valve 54, the heat source side heat exchanger 52, the expansion valve 53, the use side heat exchanger 11, the four-way valve 54, and the compressor 51 in the above order. Also, during the heating operation in the refrigerant circuit 200, a refrigerant flows through the compressor 51, the four-way valve 54, the use side heat exchanger 11, the expansion valve 53, the heat source side heat exchanger 52, the four-way valve 54, and the compressor 51 in the above order.

(2-4-1) Circulation of Refrigerant During Cooling Operation

During the cooling operation, a gas refrigerant compressed by the compressor 51 is sent to the heat source side heat exchanger 52 through the four-way valve 54. The refrigerant transfers heat in the heat source side heat exchanger 52 to air sent by the heat source side fan 55, expands and is decompressed by the expansion valve 53, and is sent to the use side heat exchanger 11 by passing through the in-unit refrigerant pipe 57, the connection pipe 91, and the in-unit refrigerant pipe 131. The low-temperature and low-pressure refrigerant sent from the expansion valve 53 exchanges heat in the use side heat exchanger 11 to take heat from air sent from the inlet 81. The gas refrigerant or two-phase gas-liquid refrigerant that has exchanged heat in the use side heat exchanger 11 passes through the in-unit refrigerant pipe 132, the connection pipe 92, the in-unit refrigerant pipe 58, and the four-way valve 54, and is suctioned into the compressor 51. The conditioned air that has lost heat in the use side heat exchanger 11 passes through the plurality of ducts 20, the plurality of fan units 30, and the plurality of air outlets 71, and is blown out into the rooms RA1 and RA2, thereby cooling the rooms RA1 and RA2.

During the cooling operation, to keep liquid compression from occurring in the compressor 51, a control is performed to adjust the opening degree of the expansion valve 53 such that the degree of superheating of the refrigerant suctioned into the suction port of the compressor 51 matches a target degree of superheating, for example. In addition, to enable processing of a cooling load while such adjustment of the opening degree of the expansion valve 53 is being performed, a control to change the operating frequency of the compressor 51 is performed. The degree of superheating is calculated by subtracting the evaporation temperature of the refrigerant inside the use side heat exchanger from the temperature of the gas refrigerant sent out from the use side heat exchanger 11, for example.

(2-4-2) Circulation of Refrigerant During Heating Operation

During the heating operation, a gas refrigerant compressed by the compressor 51 is sent to the use side heat exchanger 11 through the four-way valve 54, the in-unit refrigerant pipe 58, the connection pipe 92, and the in-unit refrigerant pipe 132. The refrigerant exchanges heat in the use side heat exchanger 11 to transfer heat to air sent from the inlet 81. The refrigerant that has exchanged heat in the use side heat exchanger 11 is sent to the expansion valve 53 through the in-unit refrigerant pipe 131, the connection pipe 91, and the in-unit refrigerant pipe 57. The low-temperature and low-pressure refrigerant expands and is decompressed by the expansion valve 53, is sent to the heat source side heat exchanger 52 and exchanges heat in the heat source side heat exchanger 52 to obtain heat from air sent by the heat source side fan 55. The gas refrigerant or two-phase gas-liquid refrigerant that has exchanged heat in the heat source side heat exchanger 52 passes through the four-way valve 54 and is suctioned into the compressor 51. The conditioned air that has gained heat in the use side heat exchanger 11 passes through the plurality of ducts 20, the plurality of fan units 30, and the plurality of air outlets 71, and is blown out into the rooms RA1 and RA2, thereby heating the rooms RA1 and RA2.

During the heating operation, a control is performed to adjust the opening degree of the expansion valve 53 such that the degree of subcooling of the refrigerant at the exit port of the use side heat exchanger 11 (the in-unit refrigerant pipe 131) matches a target value, for example. In addition, to enable processing of a heating load while such adjustment of the opening degree of the expansion valve 53 is being performed, a control to change the operating frequency of the compressor 51 is performed. The degree of subcooling of the use side heat exchanger 11 is calculated by subtracting the temperature of the liquid refrigerant exiting the use side heat exchanger 11 from the condensation temperature of the refrigerant inside the use side heat exchanger 11, for example.

The outlet unit 70 is attached to a ceiling CE with the air outlet 71 pointed downward, for example. Here, a case in which the outlet unit 70 is attached to the ceiling CE is illustrated as an example, but the outlet unit 70 may also be attached to a wall for example, and the installation location of the outlet unit 70 is not limited to the ceiling CE.

(2-5) Outlet Unit 70

The outlet unit 70 is provided with an air filter 73 inside a hollow casing 72. The outlet units 70a to 70d are connected to the fan units 30a to 30d, respectively. Conditioned air sent from the fan unit 30 passes through the air filter 73 and is blown out from the air outlet 71. Here, a case where the outlet unit 70 is provided with the air filter 73 is described, but the configuration of the outlet unit 70 does not have to include the air filter 73.

In addition, the outlet unit 70 is provided with an air deflector 74 inside the hollow casing 72. The outlet unit 70 is provided with an air deflector motor 75 for driving the air deflector 74. Here, the air deflector motor 75 for driving the air deflector 74 is an actuator. The air deflector 74 can be moved by the air deflector motor 75 and thereby adjust the wind direction. Furthermore, the air deflector 74 may also be moved to a position that closes off the air outlet 71. The air deflector motor 75 is connected to the fan controller 34 of the fan unit 30, for example. Consequently, the fan controller 34 is capable of controlling the wind direction and the opening or closing of the air outlet 71. Here, a case where the outlet unit 70 is provided with the air deflector 74 and the air deflector motor 75 is described, but the configuration of the outlet unit 70 does not have to include the air deflector 74 and the air deflector motor 75.

The inlet unit 80 is attached to the ceiling CE of the building BL with the inlet 81 pointed toward the air conditioned space SA, for example. Here, the case where the inlet unit 80 is attached to the ceiling CE is illustrated as an example, but the inlet unit 80 may also be attached to a wall of the building BL for example, and the installation location of the inlet unit 80 is not limited to the ceiling CE of the building BL.

The inlet unit 80 is provided with an air filter 83 inside a hollow casing 82. Air sent to the heat exchanger unit 10 is taken in from the inlet 81 through the air filter 83. Here, a case where the inlet unit 80 is provided with the air filter 83 is described, but the configuration of the inlet unit 80 does not have to include the air filter 83.

(2-6) Control System

Figure 4:
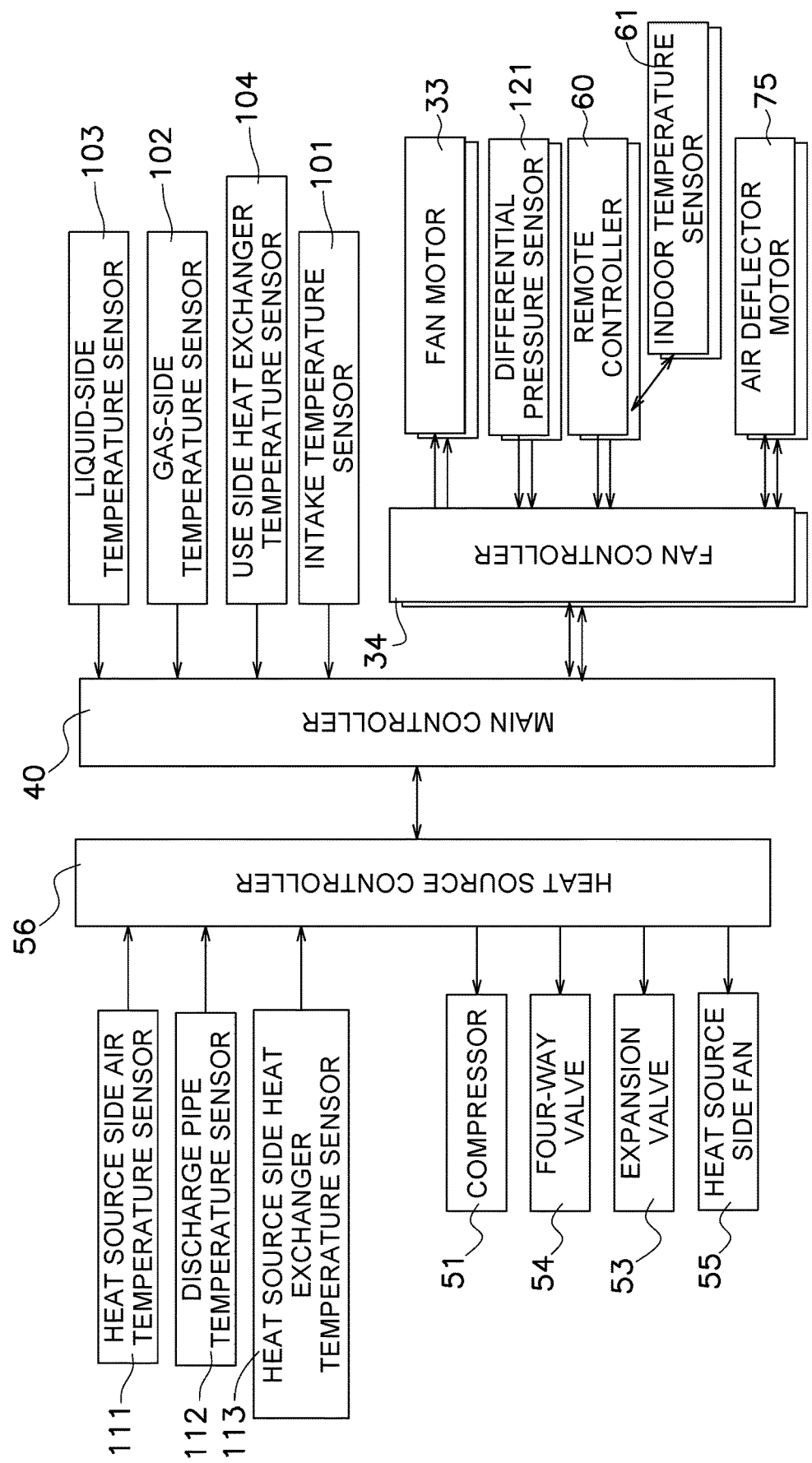
FIG. 4 is a block diagram illustrating one example of a control system.

As illustrated in FIG. 4, the main controller 40 is connected to the plurality of fan controllers 34 and the heat source controller 56. The heat source controller 56 is configured, for example, by various circuits provided on a printed circuit board connected to various equipment in the heat source unit 50, and controls the various equipment in the heat source unit 50 such as the compressor 51, the expansion valve 53, the four-way valve 54, and the heat source side fan 55. Also, the main controller 40 is connected to each remote controller 60 through each fan controller 34. The remote controllers 60a to 60d correspond to the outlet units 70a to 70d, and are connected to the fan units 30a to 30d. Here, a case where the remote controller 60 is connected to the main controller 40 through the fan controller 34 is described, but the remote controller 60 may also be connected to the main controller 40 directly. Here, a case where the main controller 40, the plurality of fan controllers 34, the heat source controller 56, and the plurality of remote controllers 60 are connected in a wired manner is illustrated, but some or all of the controllers may also be connected by wireless communication.

The main controller 40, the plurality of fan controllers 34, the heat source controller 56, and the plurality of remote controllers 60 are achieved by a computer, for example. The computer forming the main controller 40, the plurality of fan controllers 34, the heat source controller 56, and the plurality of remote controllers 60 is provided with a control computing device and a storage device. A processor such as a CPU or a GPU can be used as the control computing device. The control computing device reads a program stored in the storage device and performs predetermined image processing and arithmetic processing in accordance with the program. Further, the control computing device can write an arithmetic result to the storage device and read information stored in the storage device in accordance with the program. However, the main controller 40, the plurality of fan controllers 34, the heat source controller 56, and the plurality of remote controllers 60 may also be configured using an integrated circuit (IC) capable of performing control similar to the control performed using a CPU and memory. Examples of the IC mentioned herein include a large-scale integrated circuit (LSI), an application-specific integrated circuit (ASIC), a gate array, a field programmable gate array (FPGA), and the like.

An intake temperature sensor 101, a gas-side temperature sensor 102, a liquid-side temperature sensor 103, and a use side heat exchanger temperature sensor 104 are disposed in the heat exchanger unit 10. Note that a thermistor for example can be used as the above temperature sensors or a temperature sensor described later. The intake temperature sensor 101, the gas-side temperature sensor 102, the liquid-side temperature sensor 103, and the use side heat exchanger temperature sensor 104 are connected to the main controller 40, and detection results from the sensors are transmitted to the main controller 40. The intake temperature sensor 101 detects the temperature of air suctioned from the air inflow port 12a. The gas-side temperature sensor 102 detects the temperature of the refrigerant at one of the ports of the use side heat exchanger 11 connected to the in-unit refrigerant pipe 58. The liquid-side temperature sensor 103 detects the temperature of the refrigerant at the other port of the use side heat exchanger 11 connected to the in-unit refrigerant pipe 57. The use side heat exchanger temperature sensor 104 detects the heat exchanger temperature in a gas-liquid two-phase state flowing inside the use side heat exchanger 11.

A heat source side air temperature sensor 111, a discharge pipe temperature sensor 112, and a heat source side heat exchanger temperature sensor 113 are disposed in the heat source unit 50. The heat source side air temperature sensor 111, the discharge pipe temperature sensor 112, and the heat source side heat exchanger temperature sensor 113 are connected to the heat source controller 56. Detection results from the heat source side air temperature sensor 111, the discharge pipe temperature sensor 112, and the heat source side heat exchanger temperature sensor 113 are transmitted to the main controller 40 through the heat source controller 56. The heat source side air temperature sensor 111 detects the temperature of the air flow before passing through the heat source side heat exchanger 52 produced by the heat source side fan 55. The discharge pipe temperature sensor 112 is configured to detect the temperature of the refrigerant to be discharged from the compressor 51. The heat source side heat exchanger temperature sensor 113 is attached near-midway in the refrigerant flow path inside the heat source side heat exchanger 52, and detects the heat exchanger temperature in a gas-liquid two-phase state flowing through the heat source side heat exchanger 52.

A differential pressure sensor 121 and a blow-out temperature sensor 122 are disposed in the fan unit 30. The differential pressure sensor 121 detects the differential pressure in the air flow between the upstream and downstream sides of the installation location of the fan unit 30, for example. The differential pressure sensor 121 is connected to the fan controller 34 and transmits detected differential pressure data to the fan controller 34. For example, the flow path of the spot where the differential pressure sensor 121 is installed has a predetermined cross-sectional area, and the fan controller 34 can calculate the air supply amount from a value detected by the differential pressure sensor 121. In addition, the fan controller 34 can detect the wind direction from the difference in pressure detected by the differential pressure sensor 121. The blow-out temperature sensor 122 is disposed in the casing 31 of each fan unit 30, for example, and detects the temperature of the conditioned air blown out from each fan unit 30. Here, a case where the blow-out temperature sensor 122 is disposed in the casing 31 of the fan unit 30 is described, but the installation location of the blow-out temperature sensor 122 may also be another location, and may be an installation location inside the outlet unit 70, for example.

Each of the plurality of remote controllers 60 includes a built-in indoor temperature sensor 61, and is configured to input an instruction for turning the operation of the air conditioning system 1 and/or the fan unit 30 on/off, switching between cooling and heating, inputting a set temperature, and inputting a set air flow volume. The set temperature is configured to be inputtable as a numerical value, for example, and the set air flow volume is configured to be inputtable by selecting one from among very low, low, medium, and high ventilation settings. For example, the user uses an input button on the remote controller 60 to select the cooling operation, set the set temperature to 28° C., and select medium ventilation as the set air flow volume. The remote controller 60 is a third temperature sensor.

The main controller 40 calculates the necessary air supply amount to be blown out from each fan unit 30 from the blow-out temperature detected by each blow-out temperature sensor 122 and the set temperature, and controls the rotation speed of the fan motor 33 to bring the detected value from the indoor temperature sensor 61 close to the set temperature.

For example, consider the case where initially three fan units 30 are connected to the heat exchanger unit 10 and one of the air outflow ports 12b of the heat exchanger unit 10 is blocked. In such a case, when adding an additional fan unit 30, a duct 20 is connected to the blocked air outflow port 12b, the additional fan unit 30 is connected to the duct 20, and the outlet unit 70 is connected to the added fan unit 30. If the fan controller 34 of the fan unit 30 added in this way is connected to the main controller 40, a network of the main controller 40 and four fan controllers 34 is formed, and a network that delivers instructions from the main controller 40 can be constructed easily.

(3) Operations by Air Conditioning System 1

In the air conditioning system 1, the set air flow volumes inputted from the plurality of remote controllers 60 act as a basic air supply amount used to determine the air supply amounts of the plurality of fan units 30. However, if the set air flow volume is left unchanged, the set temperature will fall in the cooling operation and rise in the heating operation after the set temperature is achieved. Accordingly, to cause the indoor air temperature to converge on the set temperature, the air supply amount of each fan unit 30 is changed from the set air flow volume by a command from the main controller 40. The main controller 40 calculates an air conditioning load from the temperature difference between the indoor air temperature and the set temperature, and determines the necessary air supply amount from the air conditioning load and the fan temperature of each fan unit 30. For example, in the case where the indoor air temperature matches the set temperature and there is no temperature difference, the air conditioning load is 0, and therefore the main controller 40 stops the fan in each fan unit 30 where the indoor air temperature matches the set temperature, even if the set air flow volume is not 0. However, to avoid the backflow of air from the air outlet 71 toward the heat exchanger unit 10, each fan unit 30 determined to be stopped according to the air conditioning load may be controlled such that the air supply amount is not 0 in order to suppress backflow.

(3-1) Startup

Each fan controller 34 of the fan units 30a to 30d transmits the air supply amount that each of the fan units 30a to 30d is to supply from the set air flow volume of the four remote controllers 60 to the main controller 40. Note that when even a stopped fan unit 30 is operating to send an extremely low amount of air to avoid the backflow of air from the air outlet 71 toward the heat exchanger unit 10, the air conditioning system 1 may be configured to include the slight air supply amount in the total air flow volume. Alternatively, the air conditioning system 1 may be configured not to include the slight air supply amount in the total air flow volume.

The main controller 40 totals the air supply amounts transmitted from all of the fan units 30 to calculate the total air flow volume to be passed through the use side heat exchanger 11. The main controller 40 calculates the temperature of air suctioned into the heat exchanger unit 10 from the intake temperature sensor 101 of the heat exchanger unit 10. Additionally, the main controller 40 requests the heat source controller 56 of the heat source unit 50 for a required refrigerant circulation rate calculated from the total air flow volume and the air temperature of the air to be passed through the use side heat exchanger 11. In response to the request from the main controller 40, the heat source controller 56 of the heat source unit 50 changes the operating frequency of the compressor 51 to change the refrigerant circulation rate.

(3-2) Normal Operation

In the normal operation, the air conditioning system 1 varies the control between the case where the total air flow volume is at or above a lower limit and the case where the total air flow volume is below the lower limit.

(3-2-1) When Total Air Flow Volume is at or Above Lower Limit

When a predetermined length of time has elapsed since startup and a normal operating state is reached, the main controller 40 determines whether or not the total air flow volume is at or above the lower limit. The setting of the lower limit will be described later. If the total air flow volume is at or above the lower limit, the main controller 40 controls the air conditioning system 1 according to the following procedure.

When a predetermined length of time has elapsed since startup and the normal operating state is reached, each fan controller 34 is configured to recalculate the individual air supply amount on a predetermined interval. In the recalculation, each fan controller 34 uses the indoor air temperature detected by the remote controller 60 for example to calculate an air conditioning load on the basis of a status such as the indoor air temperature near each outlet unit 70 "approaching" or "diverging from" the set temperature, and corrects the set air flow volume. Additionally, each fan unit 30 transmits the corrected air supply amount to the main controller 40. Note that the main controller 40 may also be configured to perform the calculations related to correcting the set air flow volume. The main controller 40 recalculates the air supply amounts transmitted from the plurality of fan controllers 34 at each interval to calculate the total air flow volume, and if the total air flow volume is at or above the lower limit, the main controller 40 requests the heat source controller 56 of the heat source unit 50 for the required refrigerant circulation rate calculated from the total air flow volume and the air temperature of the air to be passed through the use side heat exchanger 11 at each interval. In response to the request from the main controller 40, the heat source controller 56 of the heat source unit 50 changes the operating frequency of the compressor 51 to change the refrigerant circulation rate.

(3-2-2) When Total Air Flow Volume is Below Lower Limit

When the total air flow volume is below the lower limit, the main controller 40 calculates the shortage, that is, the difference between the calculated total air flow volume and the lower limit. The main controller 40 assigns the shortage to the plurality of fan units 30 according to a predetermined air flow volume distribution rule. When assigning the shortage to the plurality of fan units 30, because it is sufficient for the total air flow volume to be at or above the lower limit, an air supply amount that matches the shortage is assigned in some cases, and an air supply amount greater than the shortage is assigned in other cases.

For example, consider the case where the lower limit is 30 m$^3$/min, the fan controller 34 of the fan unit 30a requests 16 m$^3$/min, the fan controller 34 of the fan unit 30b requests 0 m$^3$/min, the fan controller 34 of the fan unit 30c requests 10 m$^3$/min, and the fan controller 34 of the fan unit 30d requests 6 m$^3$/min to the main controller 40. In this case, the total air flow volume calculated by the main controller 40 is 32 m$^3$/min >30 m$^3$/min, and the main controller 40 determines that the total air flow volume is above the lower limit.

Next, if an instruction to stop sending air is inputted from the remote controller 60 into the fan controller 34 of the fan unit 30c, the request from the fan controller 34 of the fan unit 30c is changed from 10 m$^3$/min to 0 m$^3$/min. Consequently, the total air flow volume falls from 32 m$^3$/min to 22 m$^3$/min, and therefore the main controller 40 determines that an instruction that would bring the total air flow volume below the lower limit has been issued.

As one example, in the case of determining that a change that would bring the total air flow volume below the lower limit has been instructed, the main controller 40 distributes the shortage equally among the operating fan units 30. In the case described above, 8 (=30−22) m$^3$/min is distributed as 4 m$^3$/min to the fan unit 30a and 4 m$^3$/min to the fan unit 30d, so that the fan unit 30a is changed to 20 m$^3$/min and the fan unit 30d is changed to 10 m$^3$/min.

As another example, in the case of determining that a change that would bring the total air flow volume below the lower limit has been instructed, the main controller 40 distributes the shortage equally among all of the fan units 30. In the case described above, 8 (=30−22) m$^3$/min is distributed as 2 m$^3$/min each to the fan units 30a to 30d, such that the fan unit 30a is changed to 18 m$^3$/min, the fan unit 30b is changed to 2 m$^3$/min, the fan unit 30c is changed to 2 m$^3$/min, and the fan unit 30d is changed to 8 m$^3$/min.

(3-2-3) Setting the Lower Limit

The main controller 40 determines the lower limit of the total air flow volume of the air conditioning system 1 on the basis of the heat exchanger temperature, for example. For example, if the heat exchanger temperature is high in the cooling operation, the capacity of the heat source unit 50 to supply heating energy is determined to be insufficient, and a high lower limit of the total air flow volume is set. If the heat exchanger temperature is low in the cooling operation compared to such a case, the capacity of the heat source unit 50 to supply heating energy is determined to be more than sufficient, and a lower limit of the total air flow volume that is lower than the above case is set. The specific value of the lower limit is determined by experiment using the actual equipment of the air conditioning system 1 and/or by simulation.

(3-2-4) Detection of Air Backflow

For example, in the distribution flow path including the duct 20a, the fan unit 30a, and the outlet unit 70a, an air flow proceeding from the heat exchanger unit 10 to the air outlet 71 is a normal air flow, but conversely, an air flow proceeding from the air outlet 71 to the heat exchanger unit 10 is an abnormal air flow that acts as air backflow. The same applies to the distribution flow paths including the ducts 20b to 20d, the fan units 30b to 30d, and the outlet units 70b to 70d, and air flows proceeding from the air outlets 71 to the heat exchanger unit 10 act as air backflow. The differential pressure sensor 121 respectively provided in each of the fan units 30a to 30d transmits detection results to the main controller 40 through the fan controllers 34.

The main controller 40 determines that the air flow is normal when the air pressure at the exhaust port 37 is lower than or equal to the air pressure at the intake port 36 of the fan units 30a to 30d, and conversely determines that air backflow is occurring when the air pressure at the exhaust port 37 is higher than the air pressure at the intake port 36 of the fan units 30a to 30d.

(3-2-5) Operation when Air Backflow Occurs

The main controller 40 clears air backflow through the cooperation of the fan units 30. Specifically, the main controller 40 detects a fan unit 30 connected to a distribution flow path where air backflow is occurring. The main controller 40 transmits a command to increase the rotation speed of the fan motor 33 to the fan controller 34 of the fan unit 30 on the distribution flow path where air backflow is occurring. For example, in the case where the fan motor 33 has stopped, a command to start driving at a predetermined rotation speed is transmitted. As another example, in the case where the fan motor 33 is rotating at a low speed, a command to raise the rotation speed of the fan motor 33 further is transmitted.

Note that if the air resistance can be changed with the air deflector 74, the air deflector 74 may also be used to clear the air backflow. For example, in the case where the fan motor 33 has stopped, the air deflector 74 of the outlet unit 70 where air backflow is occurring may be configured to be fully closed. In the case where the fan motor 33 is rotating at a low speed, the main controller 40 may be configured to transmit a command for raising the rotation speed of the fan motor 33 and also increasing the air resistance of the air deflector 74.

Additionally, a configuration may also be adopted in which a backflow prevention damper that is fully closed just by the force of a backflow air current is provided in the distribution flow path. In this case, backflow can be prevented without a command from the main controller 40.

(4) Modifications

(4-1) Modification 1A

The first embodiment above describes a case where the ducts 20 are directly connected to the heat exchanger unit 10, but the ducts 20 may also be indirectly connected to the heat exchanger unit 10. For example, a configuration is possible in which an attachment having a plurality of air outlets for connecting the ducts 20 to the heat exchanger unit 10 is installed between the ducts 20 and the heat exchanger unit 10. By preparing multiple types of attachments connectible to different numbers of ducts 20, the number of ducts 20 that can be connected to the same type of heat exchanger unit 10 can be changed.

(4-2) Modification 1B

The first embodiment above describes a case where a single outlet unit 70 is connected to a single fan unit 30, but a configuration in which a plurality of outlet units 70 are connected to a single fan unit 30 is also possible. That is to say, a plurality of air outlets 71 may be provided with respect to a single fan unit 30. In this case, a plurality of remote controllers 60 may also be connected to each fan unit 30, such as by providing one remote controller 60 for each outlet unit 70.

(4-3) Modification 1C

The first embodiment above describes a case where a vent 79 is provided and only a single inlet 81 is provided in the wall between the rooms RA1 and RA2. However, the number of inlets 81 to be provided is not limited to one and may also be a plurality. Also, the inlet 81 may be provided plurally in the same room RA1, or in both of the different rooms RA1 and RA2, for example. In the case of providing the inlet 81 in each of the rooms RA1 and RA2, the vent 79 does not have to be provided.

(4-4) Modification 1D

Another duct 20 and another fan unit 30 may also be connected to the fan unit 30 connected to the other end 22 of a duct 20 whose one end 21 is connected to the heat exchanger unit 10.

For example, a plurality of fan units 30 may be connected in series with respect to a single distribution flow path. As one example of such a connection configuration, two ducts 20, two fan units 30, and one outlet unit 70 may be connected in series from the heat exchanger unit 10 in the order of a duct 20, a fan unit 30, a duct 20, a fan unit 30, and the outlet unit 70. By providing a plurality of power sources in a single distribution flow path, it is possible to set a longer distance from the heat exchanger unit 10 to the air outlet 71 compared to the case of providing just one of the same power source.

(4-5) Modification 1E

The first embodiment above describes a case where a single heat exchanger unit 10 is connected to a single heat source unit 50, but the connection configuration between the heat source unit 50 and the heat exchanger unit 10 is not limited thereto. For example, a plurality of heat exchanger units 10 may also be connected to a single heat source unit 50. Also, a plurality of heat source units 50 may be connected to a plurality of heat exchanger units 10. In these connection configurations, a flow rate adjustment device that adjusts the flow rate of the refrigerant flowing through the use side heat exchanger 11 may also be provided in the heat exchanger units 10. A flow control valve with a variable opening degree may be used as such a flow rate adjustment device. Also, in the case where a plurality of heat exchanger units 10 are provided in a single refrigerant circuit 200, when a refrigerant subsystem that circulates a refrigerant in a specific heat exchanger unit 10 among the plurality of heat exchanger units 10 is being formed inside the refrigerant circuit 200, the lower limit of the air flow volume passing through the use side heat exchanger 11 of the specific heat exchanger unit 10 may be set to change depending on the state of the refrigerant circulating through the refrigerant subsystem or a parameter that affects the circulation rate.

(4-6) Modification 1F

The first embodiment above describes a case where the compressor 51 of the heat source unit 50 is a type having a variable rotation speed. However, a type of compressor 51 that does not have a variable rotation speed may also be used in the heat source unit 50.

(4-7) Modification 1G

The first embodiment above describes a case where the air conditioning system 1 is configured to be switched between the cooling operation and the heating operation. However, the technical concept of the first embodiment above can be applied to an air conditioning system that is dedicated to cooling only or heating only.

(4-8) Modification Example 1H

The first embodiment above describes a case where the heat exchanger unit 10 is connected to the heat source unit 50 to form a refrigeration cycle apparatus that runs a refrigerant through the use side heat exchanger 11, but the heat source unit 50 is not limited to the case of connecting the heat exchanger unit 10 to form a refrigeration cycle apparatus. A heat source unit that supplies heating energy to the use side heat exchanger 11 may also be configured to supply a heat medium such as heated water and/or cooled water, for example.

In the case of a configuration that runs a heat medium to the use side heat exchanger 11 in this way, a flow rate adjustment device for adjusting the flow rate of the heat medium flowing to the use side heat exchanger 11 may also be provided in the heat exchanger unit 10. Also, in the case of connecting the heat exchanger unit 10 to such a heat source unit that supplies a heat medium, a plurality of heat exchanger units 10 may also be connected to a single heat source unit.

(4-9) Modification Example 1I

The first embodiment above describes a case where, during startup, the main controller 40 requests the refrigerant circulation rate required by the refrigerant circuit 200 as calculated from the calculated total air flow volume of the air passing through the use side heat exchanger 11 and the calculated air temperature of the air suctioned into the heat exchanger unit 10. However, the method by which the main controller 40 determines the required refrigerant circulation rate to be requested is not limited to the method described above.

For example, the air conditioning system 1 may also be configured as follows. During startup, the main controller 40 totals the air supply amounts transmitted from all of the fan units 30, and calculates the total air flow volume passing through the use side heat exchanger 11. The main controller 40 stores an air flow volume table indicating relationships between the total air flow volume and the required refrigerant circulation rate in an internal memory, for example. The main controller 40 selects the air flow volume closest to the calculated total air flow volume from among the air flow volumes described in the air flow volume table. The main controller 40 requests the heat source controller 56 for a refrigerant circulation rate corresponding to the total air flow volume selected from the air flow volume table. Additionally, with regard to the difference between the air flow volume selected from the air flow volume table and the total air flow volume, the air conditioning system 1 may be configured to output a command from the main controller 40 to the fan controllers 34 and thereby cause the plurality of fan units 30 to change the air supply amount in accordance with the difference.

As another example, the air conditioning system 1 may also be configured as follows. During startup, the main controller 40 receives the set temperature from the remote controller 60 through the fan controller 34. Also, the main controller 40 receives the indoor air temperature detected by the remote controller 60, the indoor air temperature calculated from a value detected by the intake temperature sensor 101, or the indoor air temperature from an indoor temperature sensor capable of transmitting the indoor air temperature to the main controller 40. The main controller 40 calculates the overall air conditioning load on the air conditioning system 1 from the received set temperature and indoor air temperature. The main controller 40 calculates the total air flow volume and the required refrigerant circulation rate from the calculated air conditioning load. The main controller 40 calculates the individual air supply amount of each fan unit 30 by multiplying the total air flow volume by the proportion of the air conditioning load on each fan unit 30, and outputs commands to the plurality of fan controllers 34. The air conditioning system 1 may be configured such that each fan controller 34 adjusts itself to match the individual air supply amount indicated by the main controller 40.

(4-10) Modification 1J

In the air conditioning system 1 according to the first embodiment above, a case is described in which the main controller 40 mainly determines the total air flow volume and controls a condition related to the refrigerant in the heat source unit 50 to obey the determined total air flow volume. Conversely, however, the air conditioning system 1 may also be configured to mainly determine a condition related to the refrigerant in the heat source unit 50, and determine the total air flow volume to obey the condition.

For example, the air conditioning system 1 may also be configured such that the heat source controller 56 controls the operating frequency of the compressor 51 and/or the opening degree of the expansion valve 53. In the air conditioning system 1 configured in this way, the heat source controller 56 ascertains information related to the total air flow volume of the air currently passing through the use side heat exchanger 11. From information related to the operating frequency of the compressor 51 and/or the opening degree of the expansion valve 53, the heat source controller 56 transmits an instruction to the main controller 40 indicating a need to increase or decrease the air flow volume with respect to the current total air flow volume. The main controller 40 receives the instruction to increase or decrease the air flow volume from the heat source controller 56, calculates what proportional increase or decrease of the air flow volume in each fan unit 30 is suitable for reducing the energy of the system as a whole, and outputs instructions to the plurality of fan units 30.

(4-11) Modification 1K

The air conditioning system 1 according to the first embodiment above adjusts the refrigerant circulation rate of the refrigerant circuit 200 by changing the operating frequency of the compressor 51. However, the control of the refrigerant circulation rate in the air conditioning system 1 is not limited to controlling the operating frequency of the compressor 51. For example, the adjustment of the refrigerant circulation rate of the refrigerant circuit 200 may be controlled by adjusting the operating frequency of the compressor 51 while also adjusting the opening degree of the expansion valve 53, or the adjustment of the refrigerant circulation rate of the refrigerant circuit 200 may be controlled by adjusting the opening degree of the expansion valve 53.

(4-12) Modification 1L

In the first embodiment above, the lower limit of the total air flow volume is determined according to the heat exchanger temperature of the use side heat exchanger 11, but the condensation temperature (TC), the evaporation temperature (TE), or the degree of superheating (SH) and the degree of subcooling (SC) may also be used. The degree of superheating can be calculated by using the inlet temperature and the outlet temperature of the use side heat exchanger 11 or by using the inlet pressure and outlet temperature of the use side heat exchanger 11, for example. The degree of subcooling can be calculated by using the inlet temperature and the outlet temperature of the use side heat exchanger 11 or by using the inlet pressure and outlet temperature of the use side heat exchanger 11, for example.

The lower limit of the total air flow volume may be a predetermined fixed value, and if the lower limit is set to 8 $m^3$/min in advance, the main controller 40 continuously controls the air flow volume to keep from dropping below the lower limit of 8 $m^3$/min, for example.

In addition, the air conditioning system 1 may also be configured such that in the cooling operation, the lower limit of the total air flow volume is determined according to the degree of superheating, the current total air flow volume, and the intake temperature of the air suctioned into the heat exchanger unit 10, for example. The air conditioning system 1 may also be configured such that in the heating operation, the lower limit of the total air flow volume is determined according to the degree of subcooling, the current total air flow volume, and the intake temperature of the air suctioned into the heat exchanger unit 10. The air conditioning system 1 may also be configured such that the lower limit of the total air flow volume is determined according to the refrigerant circulation rate (for example, the operating frequency of the compressor 51), the evaporation temperature (TE), and the intake air temperature and intake air flow volume of the air suctioned into the heat exchanger unit 10. The air conditioning system 1 may also be configured such that the lower limit of the total air flow volume is determined according to an excess or insufficient air flow volume calculated from the dry or wet quality of the refrigerant after passing through the use side heat exchanger 11, and the current air flow volume. Furthermore, the air conditioning system 1 may also be configured such that the lower limit of the total air flow volume is determined according to the refrigerant pressure and refrigerant temperature at the outlet of the use side heat exchanger 11.

(4-13) Modification 1M

4-13-1

Figure 5:
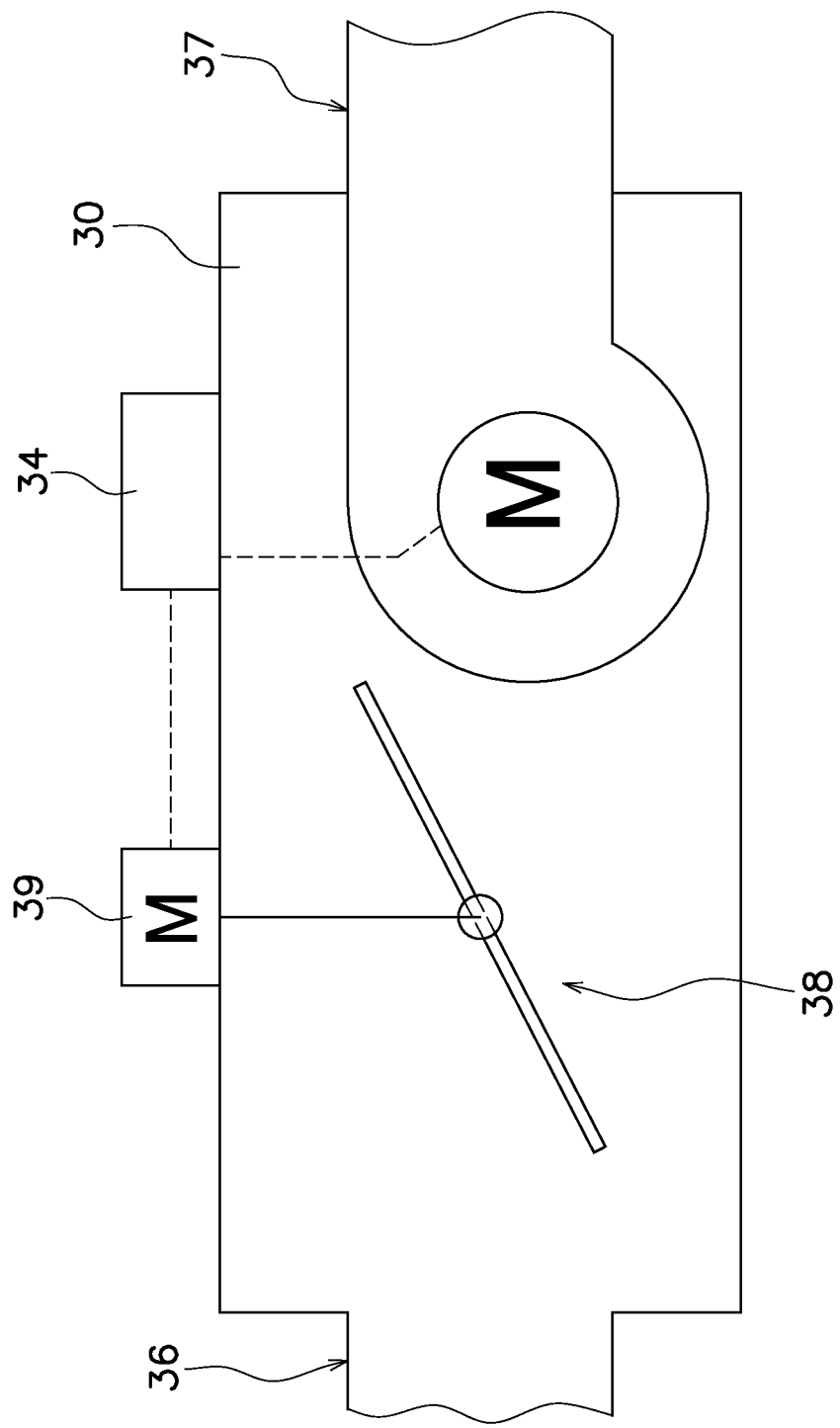
FIG. 5 is a schematic view of another example of the configuration of a fan unit.

The first embodiment is described by taking the fan motors 33 having a variable rotation speed as an example of a plurality of actuators configured to change the individual air supply amounts of the conditioned air suctioned from the heat exchanger unit 10 through the plurality of ducts 20 and supplied to the plurality of air outlets 71 in the air conditioned space SA. However, the actuators are not limited to the fan motors 33, and the driving motor 39 of the damper 38 illustrated in FIG. 5 may also be used as the plurality of actuators, for example. The fan motor 33 of the fan 32 illustrated in FIG. 5 may be a type of motor having a variable rotation speed similar to the first embodiment, or a type of motor that does not have a variable rotation speed. In the case where the fan motor 33 is a type that does not have a variable rotation speed, the air supply amount (air flow volume) from the fan unit 30 to the outlet unit 70 is changed with the damper 38 alone. In contrast, if the fan motor 33 is a type with a variable rotation speed, the air supply amount (air flow volume) from the fan unit 30 to the outlet unit 70 is changed by changing not only the opening degree of the damper 38 but also the rotation speed of the fan motor 33.

Also, a damper unit that includes the damper 38 but does not include a fan may be used as a unit for changing the individual air supply amounts of the conditioned air to be supplied to the air outlets 71. In other words, the air conditioning system 1 may also be configured to include a fan unit that simply causes a fan to rotate at a constant speed and does not have a function of changing the air supply amount, and a damper unit separate from the fan unit, for example. For example, the air conditioning system 1 may be configured such that a damper unit configured to change the air supply amount with the damper 38 is provided partway in at least one of the ducts 20a to 20d. Additionally, the air conditioning system 1 may also be configured such that the fan unit 30 having a function of changing the air supply amount and a damper unit having a function of changing the air supply amount are disposed together in at least one of the ducts 20a to 20d.

(4-13-2) Operations when Backflow Occurs

The main controller 40 clears air backflow through the cooperation of the fan units 30. To clear air backflow, first, the main controller 40 detects the fan unit 30 connected to the distribution flow path where the air backflow is occurring. In the case where the fan unit 30 is configured to adjust the air supply amount with the damper 38 alone, the main controller 40 transmits a command for changing the opening degree of the damper 38 to the fan controller 34 of the fan unit 30 in the distribution flow path where the air backflow is occurring. For example, in the case that the fan unit 30 where the air backflow is occurring is not running, a command to fully close the damper 38 is transmitted. Normally air backflow does not occur when sending air according to the opening degree of the damper 38 while causing the fan motor 33 to rotate at a constant speed, and therefore if air backflow occurs in such a case, the main controller 40 uses the remote controller 60 to notify the user of an abnormal state, for example.

In the case where the fan unit 30 is configured to adjust the air supply amount with both the rotation speed of the fan motor 33 and the opening degree of the damper 38, the main controller 40 transmits a command for changing the rotation speed of the fan motor 33 and/or the opening degree of the damper 38 to the fan controller 34 of the fan unit 30 in the distribution flow path where the air backflow is occurring. For example, in the case that the fan unit 30 where the air backflow is occurring is not running, a command to fully close the damper 38 is transmitted. As another example, in the case where the fan motor 33 is rotating at a low speed, a command to raise the rotation speed further is transmitted. Alternatively, in the case where the fan motor 33 is rotating at a low speed, the main controller 40 may be configured to transmit a command for reducing the opening degree of the damper 38 and also raising the rotation speed of the fan motor 33, for example.

(4-14) Modification 1N

The first embodiment above describes a case wherein the differential pressure sensor 121 is used as a detection device that detects air backflow, but the device that detects air backflow is not limited to a device using the differential pressure sensor 121. A directional wind speed sensor may also be used as such a detection device. In the case of using a directional wind speed sensor instead of the differential pressure sensor 121, the wind speed sensor is disposed in the fan unit 30 and connected to the fan controller 34, for example. In the case of using a directional wind speed sensor, the main controller 40 is capable of detecting that air is flowing in the normal direction when the sensor indicates a wind speed in the positive direction, and conversely detecting that air backflow is occurring in the case where the sensor indicates a wind speed in the negative direction. Additionally, the detection device may also be configured using a plurality of nondirectional wind speed sensors. If a plurality of nondirectional wind speed sensors is used to detect a wind speed distribution, and the wind speed distribution is a distribution that occurs when backflow exists, the main controller 40 may determine that backflow is occurring.

(4-15) Modification 1O

The first embodiment above describes a case where the differential pressure sensor 121 is used as the detection device that detects air backflow, but such a detection device may also be configured with a backflow detecting means described later using a temperature sensor.

An air outlet temperature sensor 105 that detects the air temperature immediately after passing through the use side heat exchanger 11 and the blow-out temperature sensor 122 attached to the fan unit 30 or the outlet unit 70 may be used as the detection device that detects air backflow. Additionally, during the cooling operation, the main controller 40 may be configured to determine that backflow is occurring in the case where the air temperature detected by the blow-out temperature sensor 122 is higher than the air temperature immediately after passing through the use side heat exchanger 11 detected by the air outlet temperature sensor 105 plus $\alpha 1°$ C. (where $\alpha 1$ is a positive real number). The air outlet temperature sensor 105 is a second temperature sensor.

Further, the blow-out temperature sensor 122 attached to the fan unit 30 or the outlet unit 70 may be used as the detection device that detects air backflow. Additionally, during the cooling operation, the main controller 40 may be configured to determine that backflow is occurring in the case of detecting that the air temperature detected by the blow-out temperature sensor 122 has risen by $\alpha 2°$ C. (where $\alpha 2$ is a positive real number) or more within a certain time.

Also, the blow-out temperature sensor 122 attached to the fan unit 30 or the outlet unit 70 and the indoor temperature sensor 61 disposed in the air conditioned space SA may be used as the detection device that detects air backflow. Additionally, during the cooling operation, the main controller 40 may be configured to determine that backflow is occurring in the case where the air temperature detected by the blow-out temperature sensor 122 is the indoor air temperature minus $\alpha 3°$ C. (where $\alpha 3$ is a positive real number) or higher.

Further, the air outlet temperature sensor 105 that detects the air temperature immediately after passing through the use side heat exchanger 11 and the blow-out temperature sensor 122 attached to the fan unit 30 or the outlet unit 70 may be used as the detection device that detects air backflow. Additionally, during the heating operation, the main controller 40 may be configured to determine that backflow is occurring in the case where the air temperature detected by the blow-out temperature sensor 122 is lower than the air temperature immediately after passing through the use side heat exchanger 11 detected by the air outlet temperature sensor 105 minus $\alpha 4°$ C. (where $\alpha 4$ is a positive real number).

Further, the blow-out temperature sensor 122 attached to the fan unit 30 or the outlet unit 70 may be used as the detection device that detects air backflow. Additionally, during the heating operation, the main controller 40 may be configured to determine that backflow is occurring in the case of detecting that the air temperature detected by the blow-out temperature sensor 122 has dropped by $\alpha 5°$ C. (where $\alpha 5$ is a positive real number) or more within a certain time.

Also, the blow-out temperature sensor 122 attached to the fan unit 30 or the outlet unit 70 and the indoor temperature sensor 61 disposed in the air conditioned space SA may be used. Additionally, during the heating operation, the main controller 40 may be configured to determine that backflow is occurring in the case where the air temperature detected by the blow-out temperature sensor 122 is the indoor air temperature plus $\alpha 6°$ C. (where $\alpha 6$ is a positive real number) or lower.

The above temperatures $\alpha 1$ to $\alpha 6$ are predetermined by experiment with real equipment or simulation performed in advance, and are stored in the main controller 40 for example.

(4-16) Modification 1P

The first embodiment above describes a case where the differential pressure sensor 121 is used to detect air backflow, but air backflow may also be detected by detecting reverse rotation of the fan rotor 35 in the fan 32. One method of detecting reverse rotation of the fan rotor 35 is to detect the electromotive force or current produced by reverse rotation of the fan rotor 35, for example. In addition, a switch that turns on when the fan rotor 35 rotates in reverse may be used as the method of detecting reverse rotation of the fan rotor 35.

(4-17) Modification 1Q

The first embodiment above is described by taking the case where the main controller 40 is provided in the heat exchanger unit 10 as an example. However, the location where the main controller 40 is provided is not limited to the heat exchanger unit 10. For example, the main controller 40 may also be provided in the fan unit 30.

(4-18) Modification 1R

The first embodiment above describes a case where the plurality of ducts 20a to 20d are connected to the heat exchanger unit 10, and the ducts 20a to 20d respectively extend from the heat exchanger unit 10 to the fan units 30 without branching partway along. However, ducts that branch partway along may also be used in the air conditioning system 1. For example, the air conditioning system 1 may also be configured such that a fan unit 30 is connected to each branch diverging from a single duct.

(5) Characteristics

5-1

The air conditioning system 1 described above is configured such that the differential pressure sensor 121, the wind speed sensor, the blow-out temperature sensor 122, or the air outlet temperature sensor 105 acting as the detection device that detects air backflow is disposed in the plurality of distribution flow paths including the plurality of ducts 20, the plurality of fan units 30, and the air outlets 71 of the plurality of outlet units 70, and detects air backflow in the distribution flow paths. By detecting air backflow in each distribution flow path in this way, the air conditioning system 1 can be made to operate to counteract air backflow.

Note that the air conditioning system 1 described above describes a case where the detection device is disposed with respect to all of the plurality of distribution flow paths, but the detection device does not have to be disposed with respect to all of the plurality of distribution flow paths. The detection device may also be configured to be disposed in at least one of the plurality of distribution flow paths. In this case, the air conditioning system is capable of detecting air backflow and operating to counteract the air backflow in the at least one distribution flow path where the detection device is disposed.

5-2

The air conditioning system 1 described above is configured such that the differential pressure sensor 121, the wind speed sensor, the blow-out temperature sensor 122, or the air outlet temperature sensor 105 detects air backflow in each of the plurality of distribution flow paths, and therefore air backflow can be detected in each of the plurality of distribution flow paths. Also, a control corresponding to the case where a flow of air proceeding from the distribution flow path where air backflow has occurred to another distribution flow path may be performed to suppress a drop in the heat exchange efficiency.

5-3

The air conditioning system 1 includes at least one of the differential pressure sensor 121, the wind direction sensor, the blow-out temperature sensor 122, and the air outlet temperature sensor 105 as the detection device that detects air backflow. The wind direction sensor includes a directional wind speed sensor. The air conditioning system 1 is capable of detecting air backflow precisely in locations where at least one of the differential pressure sensor 121, the wind direction sensor, the blow-out temperature sensor 122, and the air outlet temperature sensor 105 is installed inside the plurality of distribution flow paths.

5-4

In the case where the detection device that detects air backflow is configured to detect air backflow by using temperatures of air inside the plurality of distribution flow paths, such as with the blow-out temperature sensor 122 and the air outlet temperature sensor 105 for example, air backflow can be detected with an inexpensive temperature sensor such as a thermistor, and increases in costs related to detecting air backflow are moderated more easily.

5-5

In the case of detecting air backflow by using a temperature change detected by the blow-out temperature sensor 122 that acts as a first temperature sensor, air backflow can be detected in the distribution flow paths using a small number of inexpensive sensors, and the costs related to detecting air backflow are reduced more easily.

5-6

In the case of detecting air backflow by using the temperature difference between the blow-out temperature sensor 122 acting as a first temperature sensor and the air outlet temperature sensor 105 acting as a second temperature sensor installed in different flow regions, air backflow in the distribution flow paths can be detected precisely using inexpensive sensors.

5-7

In the case of detecting air backflow by using the temperature difference between the blow-out temperature sensor 122 acting as the first temperature sensor installed in a plurality of distribution flow paths and the indoor temperature sensor 61 acting as the third temperature sensor that detects the temperature in the air conditioned space, air backflow in the distribution flow paths can be detected precisely using inexpensive sensors.

5-8

The plurality of fan units 30 each internally include the fan rotor 35 and the fan motor 33 that causes the fan rotor to rotate. In the case where the detection device that detects air backflow is a device that detects the air backflow using the rotation of at least one of the fan motor 33 or the fan rotor 35, air backflow in the distribution flow paths can be detected precisely using inexpensive sensors.

5-9

The air conditioning system 1 described above is configured to generate air flow passing through the use side heat exchanger 11 by only an air suction force of the fan unit 30. Therefore, a power source for generating air flow in the heat exchanger unit 10 does not have to be provided, and it is possible to reduce the cost comparing to the case where a power source for generating air flow is provided in the heat exchanger unit 10. Also, because the heat exchanger unit 10 does not have a power source, the heat exchanger unit 10 is miniaturized more easily, and range where the air conditioning system 1 is installable can be extended.

5-10

In the case where the detection device that detects air backflow detects the air backflow, the air conditioning system 1 is configured to operate to cancel out the air backflow with the fan unit 30 of the distribution flow path that is generating the air backflow or block the air flow in the distribution flow path that is generating the air backflow using the damper 38 or the air deflector 74, and therefore can operate while also suppressing problems due to the air backflow.

Second Embodiment (6) Overall Configuration

In the air conditioning system 1 according to the first embodiment, the main controller 40 controls a plurality of actuators with a plurality of instructions related to the air supply amounts of the plurality of fan units 30. Such a configuration is not limited to the configuration of the air conditioning system 1 according to the first embodiment. The air conditioning system 1 in which the main controller 40 controls a plurality of actuators with a plurality of instructions related to the air supply amounts of the plurality of fan units 30 may also be configured like the second embodiment.

In the air conditioning system according to the second embodiment, a plurality of fan controllers acting as a plurality of sub-controllers receive a plurality of instructions transmitted by the main controller. In the air conditioning system according to the second embodiment, each of the plurality of fan controllers controls at least one of the plurality of actuators on the basis of at least one of the plurality of instructions.

Specifically, the air conditioning system 1 according to the second embodiment is described by taking the example of the case of including the configuration illustrated in FIG. 1, similarly to the air conditioning system 1 according to the first embodiment. The second embodiment describes the case where the air conditioning system 1 illustrated in FIG. 1 changes the air supply amount with the fan motor 33, but the damper 38 and the air deflector 74 are not involved in changing the air supply amount.

Like the main controller 40 according to the first embodiment, the main controller 40 according to the second embodiment calculates the necessary air supply amount to be blown out from each fan unit 30 from the blow-out temperature detected by each blow-out temperature sensor 122 and the set temperature. Specifically, for example, the main controller 40 calculates the air supply amount of each of the fan units 30*a* to 30*d* from the temperature difference between the indoor air temperature adjusted by each of the plurality of fan units 30*a* to 30*d* and the set temperature, and also the fan temperature. The main controller 40 sets the calculated air supply amount (target air supply amount) for each of the fan units 30*a* to 30*d* as an instruction to issue to each of the fan units 30*a* to 30*d*.

The main controller 40 transmits the plurality of calculated air supply amounts to the plurality of fan controllers 34 as target air supply amounts. In other words, the main controller 40 transmits a plurality of instructions to the plurality of fan controllers 34 that control the fan units 30*a* to 30*d*. The main controller 40 transmits the target air supply amount for the fan unit 30a to the fan controller 34 installed in the fan unit 30a, for example. The target air supply amount for the fan unit 30a is an instruction related to the air supply amount of the fan unit 30. The fan controller 34 of the fan unit 30a controls the rotation speed of the fan motor 33a to cause the air supply amount to approach the target air supply amount. Similarly, the main controller 40 transmits the target air supply amount for the fan units 30b to 30d to the fan controller 34 installed in the fan units 30b to 30d, for example. The fan controller 34 of the fan units 30b to 30d controls the fan motors 33b to 33d to cause the air supply amount to approach the target air supply amount.

Described in further detail, each of the fan units 30a to 30d according to the second embodiment includes a wind speed sensor instead of the differential pressure sensor 121 at the position where the differential pressure sensor 121 would have been installed as an air flow volume detector that detects the air flow volume passing through each unit. Note that the air flow volume detector is not limited to a wind speed sensor. For example, the air flow volume detector may also be the differential pressure sensor 121. For example, the fan controller 34 of the fan unit 30a compares the wind speed in the fan unit 30a to a target air flow volume (target air supply amount). If the air flow volume passing through the fan unit 30a is less than the target air flow volume, the fan controller 34 of the fan unit 30a increases the rotation speed of the fan motor 33a to increase the air flow volume (air supply amount) of the fan unit 30a and approach the target air flow volume. Conversely, if the air flow volume passing through the fan unit 30a is greater than the target air flow volume, the fan controller 34 of the fan unit 30a decreases the rotation speed of the fan motor 33a to decrease the air flow volume (air supply amount) of the fan unit 30a and approach the target air flow volume.

Here, the case where the fan controller 34 is installed in the fan unit 30 is described. However, the fan controller 34 does not have to be installed in the fan unit 30.

The embodiments of the present disclosure have been described above, but it will be understood that various modifications can be made to the embodiments and details without departing from the object and the scope of the present disclosure recited in the claims.

REFERENCE SIGNS LIST

1: Air conditioning system
10: Heat exchanger unit
11: Use side heat exchanger
20, 20a to 20d: Duct
30, 30a to 30d: Fan unit
33: Fan motor
35: Fan rotor
40: Main controller
60: Remote controller (example of third temperature sensor)
105: Air outlet temperature sensor (example of second temperature sensor)
121: Differential pressure sensor (example of detection device)
122: Blow-out temperature sensor (example of first temperature sensor)

CITATION LIST

Patent Literature

Patent Literature 1: JP H11-132489 A

The invention claimed is:

1. An air conditioning system comprising a heat exchanger unit including a use side heat exchanger, and a main controller, and configured to generate conditioned air through heat exchange in the use side heat exchanger and supply the conditioned air to an air conditioned space through a plurality of distribution flow paths that communicate with the heat exchanger unit, wherein
  each distribution flow path is connected to the heat exchanger unit and includes a duct for distributing the conditioned air and a single fan unit provided in correspondence with the duct and configured to supply the conditioned air from the heat exchanger unit through the duct to an air outlet,
  each fan unit is provided with a fan controller, a detector connected to the fan controller and configured to detect an air backflow proceeding from the air outlet toward the heat exchanger unit, and an air flow volume detector that detects an air flow volume passing through the each fan unit in which the air flow volume detector itself is provided,
  each fan controller is configured to transmit a detection result obtained by the detector to the main controller, and control to increase or decrease the air flow volume detected by the air flow volume detector and cause an air supply amount to approach a target air supply amount indicated by the main controller, and
  the main controller clears the air backflow through cooperation of the plurality of fan units.

2. The air conditioning system according to claim 1, wherein the detector includes a differential pressure sensor configured to detect a differential pressure inside the plurality of distribution flow paths and/or a wind direction sensor configured to detect a direction of a flow of air through the plurality of distribution flow paths.

3. The air conditioning system according to claim 1, wherein the detector detects the air backflow by using temperature of air inside the plurality of distribution flow paths.

4. An air conditioning system comprising a heat exchanger unit including a use side heat exchanger, and a main controller, and configured to generate conditioned air through heat exchange in the use side heat exchanger and supply the conditioned air to an air conditioned space through a plurality of distribution flow paths that communicate with the heat exchanger unit, wherein
  each distribution flow path is connected to the heat exchanger unit and includes a duct for distributing the conditioned air and a single fan unit provided in correspondence with the duct and configured to supply the conditioned air from the heat exchanger unit through the duct to an air outlet,
  each fan unit is provided with a fan controller, a detector connected to the fan controller and configured to detect an air backflow proceeding from the air outlet toward the heat exchanger unit,
  each fan controller is configured to transmit a detection result obtained by the detector to the main controller, and control to increase or decrease an air flow volume and cause an air supply amount to approach a target air supply amount indicated by the main controller, the main controller clears the air backflow through cooperation of the plurality of fan units,
the detector detects the air backflow by using temperature of air inside the plurality of distribution flow paths, and
the detector includes a first temperature sensor installed in respective ones of the plurality of distribution flow paths, and is configured to detect the air backflow in a respective flow path by using a temperature change in the first temperature sensor installed in the respective flow path.

5. An air conditioning system comprising a heat exchanger unit including a use side heat exchanger, and a main controller, and configured to generate conditioned air through heat exchange in the use side heat exchanger and supply the conditioned air to an air conditioned space through a plurality of distribution flow paths that communicate with the heat exchanger unit, wherein
each distribution flow path is connected to the heat exchanger unit and includes a duct for distributing the conditioned air and a single fan unit provided in correspondence with the duct and configured to supply the conditioned air from the heat exchanger unit through the duct to an air outlet,
each fan unit is provided with a fan controller, a detector connected to the fan controller and configured to detect an air backflow proceeding from the air outlet toward the heat exchanger unit,
each fan controller is configured to transmit a detection result obtained by the detector to the main controller, and control to increase or decrease an air flow volume and cause an air supply amount to approach a target air supply amount indicated by the main controller,
the main controller clears the air backflow through cooperation of the plurality of fan units,
the detector detects the air backflow by using temperature of air inside the plurality of distribution flow paths, and
the detector includes a first temperature sensor installed in respective ones of the plurality of distribution flow paths and a second temperature sensor installed in a different flow region of the plurality of distribution flow paths, and is configured to detect the air backflow in a respective flow path by using a temperature difference between the first temperature sensor installed in the respective flow path and the second temperature sensor.

6. An air conditioning system comprising a heat exchanger unit including a use side heat exchanger, and a main controller, and configured to generate conditioned air through heat exchange in the use side heat exchanger and supply the conditioned air to an air conditioned space through a plurality of distribution flow paths that communicate with the heat exchanger unit, wherein
each distribution flow path is connected to the heat exchanger unit and includes a duct for distributing the conditioned air and a single fan unit provided in correspondence with the duct and configured to supply the conditioned air from the heat exchanger unit through the duct to an air outlet,
each fan unit is provided with a fan controller, a detector connected to the fan controller and configured to detect an air backflow proceeding from the air outlet toward the heat exchanger unit,
each fan controller is configured to transmit a detection result obtained by the detector to the main controller, and control to increase or decrease an air flow volume and cause an air supply amount to approach a target air supply amount indicated by the main controller,
the main controller clears the air backflow through cooperation of the plurality of fan units,
the detector detects the air backflow by using temperature of air inside the plurality of distribution flow paths, and
the detector includes a first temperature sensor installed in respective ones of the plurality of distribution flow paths and further includes a third temperature sensor configured to detect a temperature of the air conditioned space, and is configured to detect the air backflow in a respective flow path by using a temperature difference between the first temperature sensor installed in the respective flow path and the third temperature sensor.

7. The air conditioning system according to claim 1, wherein
the fan unit internally includes a fan rotor and a fan motor configured to cause the fan rotor to rotate, and
the detector detects the air backflow by using rotation of at least one of the fan motor and the fan rotor.

8. The air conditioning system of claim 1, wherein air flow passing through the use side heat exchanger is generated by only an air suction force of the fan unit.

9. The air conditioning system according to claim 1, wherein in a case where the detector detects the air backflow in a respective distribution flow path, the fan unit in the respective distribution flow path where the air backflow is occurring is made to operate to cancel out the air backflow or to block air flow in the respective distribution flow path where the air backflow is occurring.

10. The air conditioning system according to claim 2, wherein the detector detects the air backflow by using temperature of air inside the plurality of distribution flow paths.

11. The air conditioning system of claim 2, wherein air flow passing through the use side heat exchanger is generated by only an air suction force of the fan unit.

12. The air conditioning system of claim 3, wherein air flow passing through the use side heat exchanger is generated by only an air suction force of the fan unit.

13. The air conditioning system of claim 4, wherein air flow passing through the use side heat exchanger is generated by only an air suction force of the fan unit.

14. The air conditioning system of claim 5, wherein air flow passing through the use side heat exchanger is generated by only an air suction force of the fan unit.

15. The air conditioning system of claim 6, wherein air flow passing through the use side heat exchanger is generated by only an air suction force of the fan unit.

16. The air conditioning system of claim 7, wherein air flow passing through the use side heat exchanger is generated by only an air suction force of the fan unit.

17. The air conditioning system according to claim 2, wherein in a case where the detector detects the air backflow in a respective distribution flow path, the fan unit in the respective distribution flow path where the air backflow is occurring is made to operate to cancel out the air backflow or to block air flow in the respective distribution flow path where the air backflow is occurring.

18. The air conditioning system according to claim 3, wherein in a case where the detector detects the air backflow, the fan unit in the distribution flow path where the air backflow is occurring is made to operate to cancel out the air backflow or to block air flow in the distribution flow path where the air backflow is occurring.

19. The air conditioning system according to claim 4, wherein in a case where the detector detects the air backflow in a respective distribution flow path, the fan unit in the respective distribution flow path where the air backflow is occurring is made to operate to cancel out the air backflow or to block air flow in the respective distribution flow path where the air backflow is occurring.

20. The air conditioning system according to claim 5, wherein in a case where the detector detects the air backflow in a respective distribution flow path, the fan unit in the respective distribution flow path where the air backflow is occurring is made to operate to cancel out the air backflow or to block air flow in the respective distribution flow path where the air backflow is occurring.

21. The air conditioning system according to claim 1, wherein the detector also functions as the air flow volume detector.

* * * * *